(12) United States Patent
Wittenberg et al.

(10) Patent No.: US 10,277,295 B2
(45) Date of Patent: Apr. 30, 2019

(54) SIMULTANEOUS NULLING AND BEAMFOCUSING FROM DISPARATE ANTENNAS

(71) Applicant: The Boeing Company, Chicago, IL (US)

(72) Inventors: Peter S. Wittenberg, St. Louis, MO (US); Debra P. Michal, St. Louis, MO (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/167,265

(22) Filed: Jan. 29, 2014

(65) Prior Publication Data
US 2015/0215021 A1 Jul. 30, 2015

(51) Int. Cl.
*H04B 7/06* (2006.01)
*H04B 7/08* (2006.01)

(52) U.S. Cl.
CPC ......... *H04B 7/0617* (2013.01); *H04B 7/0634* (2013.01); *H04B 7/086* (2013.01)

(58) Field of Classification Search
CPC .......... G01S 3/74; H04B 7/086; H01Q 3/2611
See application file for complete search history.

(56) References Cited

U.S. PATENT DOCUMENTS

| | | | |
|---|---|---|---|
| 6,801,161 B2* | 10/2004 | Lehtomaki et al. | 342/377 |
| 7,039,363 B1* | 5/2006 | Kasapi | H04B 7/0854 370/347 |
| 7,254,199 B1* | 8/2007 | Desloge | 375/350 |
| 7,609,206 B1* | 10/2009 | Jensen et al. | 342/377 |
| 2002/0061768 A1 | 5/2002 | Liang et al. | |
| 2004/0235529 A1* | 11/2004 | Tarokh et al. | 455/562.1 |
| 2006/0292990 A1* | 12/2006 | Karabinis | H04B 7/18513 455/63.4 |
| 2009/0232229 A1* | 9/2009 | Sandhu | H04L 5/0037 375/260 |
| 2009/0252251 A1* | 10/2009 | Tosato | H04B 7/0632 375/267 |
| 2010/0106440 A1* | 4/2010 | Richmond | 702/71 |
| 2011/0012787 A1* | 1/2011 | Na | H01Q 3/2605 342/373 |

(Continued)

FOREIGN PATENT DOCUMENTS

| | | |
|---|---|---|
| CN | 101849367 | 9/2010 |
| EP | 2575274 A1 | 4/2013 |
| WO | WO 2014/008104 A1 | 1/2014 |

OTHER PUBLICATIONS

European Patent Application No. 15153059.9; Extended Search Report; dated Jun. 3, 2015; 6 pages.

(Continued)

*Primary Examiner* — Sung S Ahn
(74) *Attorney, Agent, or Firm* — Gates & Cooper LLP

(57) ABSTRACT

In an antenna array, signals may be manipulated to increase coherency at certain locations (beamfocusing) and reduce or cancel the signals at other locations (nulling). This is accomplished by multiplying the signals received or transmitted by the set of antennas by a weight vector that is generated by determining a covariance matrix based on a vector representing signals at the set of antennas, vectors representing the desired beamfocusing and nulling locations, and a desired nulling depth.

4 Claims, 3 Drawing Sheets

(56) References Cited

U.S. PATENT DOCUMENTS

| | | | |
|---|---|---|---|
| 2011/0235750 A1* | 9/2011 | Shin .................... | H04B 7/0434 |
| | | | 375/296 |
| 2011/0241941 A1* | 10/2011 | Krich et al. ................. | 342/373 |
| 2014/0219449 A1* | 8/2014 | Shattil et al. ................ | 380/270 |
| 2014/0278394 A1* | 9/2014 | Bastyr et al. ................ | 704/233 |
| 2014/0327576 A1* | 11/2014 | Kumar ......................... | 342/367 |

OTHER PUBLICATIONS

Canada Patent Application No. 2869349; Office Action; dated Feb. 2, 2016; 4 pages.
Chinese Office Action (with English translation) dated Aug. 3, 2018 for Chinese Patent Application No. 201510043478.7.

* cited by examiner

SIMULTANEOUS NULLING AND BEAMFOCUSING FROM DISPARATE ANTENNAS

BACKGROUND

Wireless communications technologies continue to advance rapidly, enabling increasingly larger transmission and reception bandwidth. One method used to increase bandwidth is to use multiple antennas at one or both of a transmitting entity and a receiving entity engaged in wireless communication. Various means and methods have been developed for wireless communications using such configurations of multiple antennas. Among the benefits that multiple antenna configurations may provide is the ability to combine signals from the multiple antennas to increase power and transmit a signal farther in a particular direction than any single antenna of the same type could and to null the transmitted signal in another direction. However, the use of multiple antennas introduces several possible issues. Among these are interference between the multiple antennas and coordination of the signals transmitted and received by sets of multiple antennas in order to ensure a coherent received communication. Moreover, current multiple antenna configurations are not able to increase signal coherency at a particular location (as opposed to direction) and null a signal at another location.

SUMMARY

Illustrative examples of the present invention include, without limitation, a method, system, and computer-readable storage medium. In one aspect, a method for beamfocusing and nulling signals includes determining a first vector representing signals received at each of a plurality of antennas and determining a weight vector based on the first vector, a nulling location, and a beamfocusing location. The method further includes applying the weight vector to signals at the plurality of antennas.

In another aspect, a system for beamfocusing and nulling signals may include a memory with executable instructions and a processor that executes the instructions to determine a first vector representing signals received at each of a plurality of antennas, and determine a weight vector based on the first vector, a nulling location, and a beamfocusing location. The processor may then apply the weight vector to signals at the plurality of antennas.

In another aspect, a non-transitory computer-readable storage device may have computer-readable instructions stored thereon that cause a processor to determine a first vector representing signals received at each of a plurality of antennas, and determine a weight vector based on the first vector, a nulling location, and a beamfocusing location. The processor may apply the weight vector to signals at the plurality of antennas.

Other features of the inventive systems and methods are described below. The features, functions, and advantages can be achieved independently in various examples or may be combined in yet other examples, further details of which can be seen with reference to the following description and drawings.

BRIEF DESCRIPTION OF DRAWINGS

Examples of techniques in accordance with the present disclosure are described in detail below with reference to the following illustrations.

DETAILED DESCRIPTION

In an example of the disclosed subject matter, signals from multiple antennas may be manipulated to provide a stronger, more focused signal to one or more particular locations (may be referred to herein as "beamfocusing") and to cancel each other out as much as possible to provide a less detectable or undetectable signal at one or more other particular locations (may be referred to herein as "nulling"). The disclosed examples may be used at transmitting and/or receiving antennas. The disclosed examples may be used to provide a better signal, or to better receive a signal, at locations where such transmission or reception is desired, while preventing reception of a signal at particular locations. The presently disclosed examples may also be used to remove interfering signals received by an antenna.

Figure 1:
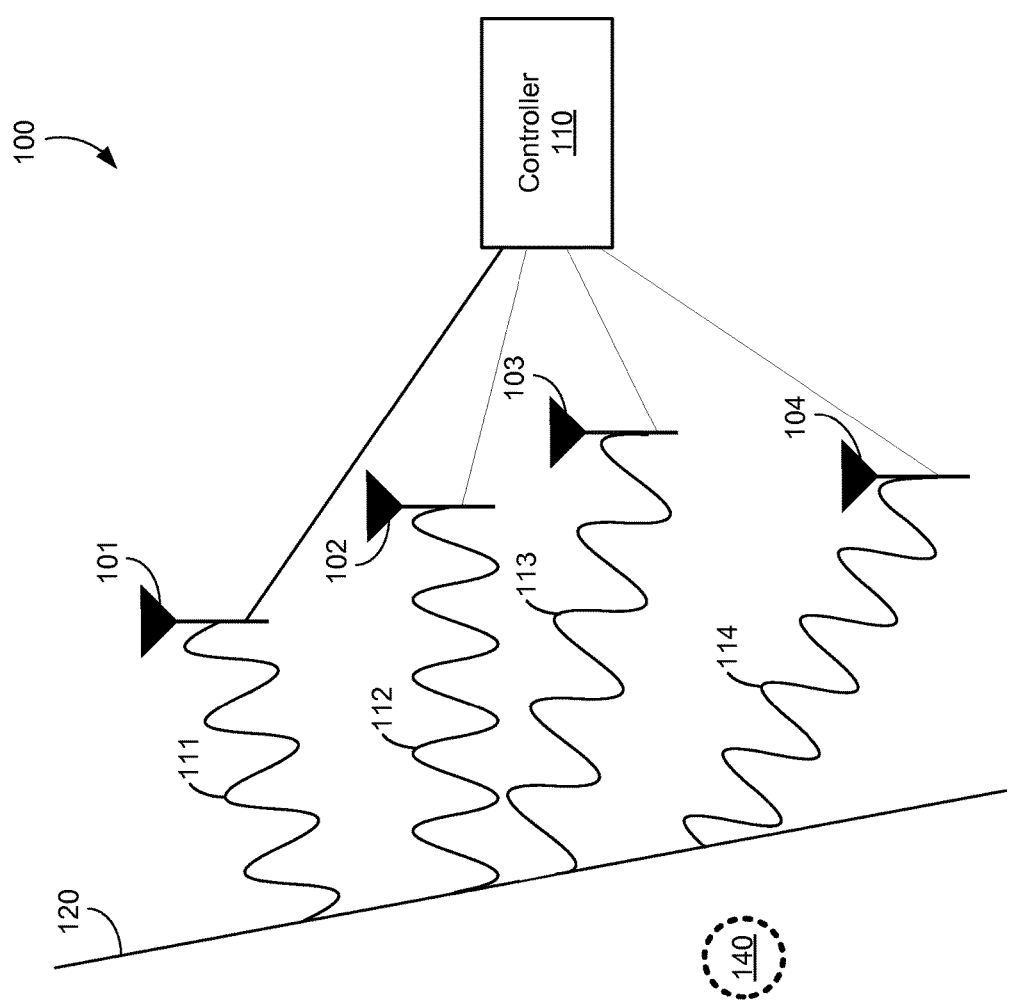
FIG. 1 depicts an example system for nulling and beamfocusing.

FIG. 1 illustrates example system 100 that may implement aspects of the present disclosure. System 100 may include multiple antennas 101, 102, 103, and 104 that each may be antennas of any type capable of transmitting and receiving electromagnetic waves, including, but not limited to, omnidirectional antennas, dipole antennas, and arrays of antennas. Each of antennas 101, 102, 103, and 104 may be the same type of antenna as the others, or each may be a different type of antenna than the others. Each of antennas 101, 102, 103, and 104 may be configured with one or more radios. Each of antennas 101, 102, 103, and 104 may be a single antenna or any set or array of multiple antennas. Each of antennas 101, 102, 103, and 104 may include one or more electromagnetic transmission and reception components and one or more signal processing components. Each of antennas 101, 102, 103, and 104 may be geographically separate from each other antenna by any distance (e.g., inches to many miles). Note that while four antennas are shown in FIG. 1, any number of multiple antennas may be used in other examples and are contemplated as within the scope of the present disclosure.

In one example, each of antennas 101, 102, 103, and 104 may be an antenna configured on a separate and distinct mobile radio and configured to transmit and receive signals from other antennas that may be stationary or mobile. For example, each of antennas 101, 102, 103, and 104 may be transported by one of four individual users or in one of four vehicles, and may be operated according to the present disclosure whether such individuals or vehicles are stationary or in motion. Such vehicles may include unmanned aerial vehicles (UAV). Alternatively, each of antennas 101, 102, 103, and 104 may be stationary antennas, each configured at a distinct single location and configured to transmit and receive signals from other antennas that may be stationary or mobile.

Each of antennas 101, 102, 103, and 104 may be communicatively connected to controller 110 that may operate, instruct, or otherwise control each of antennas 101, 102, 103, and 104. Controller 110 may control the magnitude, frequency, and phase of the signals output by each of antennas 101, 102, 103, and 104. Alternatively, in some examples each of antennas 101, 102, 103, and 104 may be communicatively connected to each other antenna, and a component of one or more of antennas 101, 102, 103, and 104 may serve the functions described herein as being performed by controller 110. In other examples, a single antenna of antennas 101, 102, 103, and 104, or a device associated with a single antenna of antennas 101, 102, 103, and 104, may perform the functions of an antenna array controller as described herein. Any alternative configuration that implements the disclosed aspects is contemplated. Any communicative connections may be wired, wireless, or a combination thereof, using any communications means or technologies. There may be multiple communications links between antennas and/or devices. All such configurations are contemplated as within the scope of the present disclosure.

In system 100, each of antennas 101, 102, 103, and 104 may be transmitting and/or receiving signals 111, 112, 113, and 114, respectively, which may meet incident plane wave 120. Each of signals 111, 112, 113, and 114 represents electromagnetic waves of any type that may be received and/or transmitted by the respective antenna. The signals 111, 112, 113, and 114 transmitted from antennas 101, 102, 103, and 104 may additively interfere at some receiving locations, creating a more coherent signal at such locations (i.e., beamfocusing). In the example shown in FIG. 1, location 130 (denoted by a solid circle) may be a location where a more coherent reception of the signals transmitted by antennas 101, 102, 103, and 104 may be desired. The signals 111, 112, 113, and 114 transmitted from antennas 101, 102, 103, and 104 may also interfere with one another at some receiving locations, canceling each other out to at least some extent at such locations, thereby making the signal less coherent, undetectable, or otherwise difficult to receive at such locations (i.e., nulling). In the example shown in FIG. 1, location 140 (denoted by a dashed circle) may be a location where a less coherent reception of the signals transmitted by antennas 101, 102, 103, and 104 may be desired.

The examples set forth herein allow beamfocusing and nulling at particular locations rather than only in particular directions. The pattern of signal transmission and interference at particular locations relative to the transmitting antennas may be determined by various factors, including azimuth, elevation, and range. In an example, in order to produce a coherent, or beamfocused, signal in one location while also producing a nulled signal in another location, the following process may be used. First, a vector x may be defined as the radio frequency (RF) energy $x_1, x_2, x_3, \ldots x_N$ transmitted or received from a set of N antennas, as shown in equation (1):

$$x = \begin{bmatrix} x_1 \\ x_2 \\ x_3 \\ \vdots \\ x_N \end{bmatrix} \tag{1}$$

In the example of FIG. 1, the signals transmitted or received by antennas 101, 102, 103, and 104, signals 111, 112, 113, and 114 respectively, may be $x_1, x_2, x_3,$ and $x_4$ in equation (1). Next, a covariance matrix may be generated using x from equation (1) and the Hermitian transpose of x, as shown in equation (2), where $xx^H$ denotes the Hermitian transpose of x:

$$R_{xx} = xx^H \tag{2}$$

A complex vector, illustrated below as equation (3), may define the magnitude and phase of a signal x received at each of the antenna nodes of the set of N antennas from a location b, such as location 130 in FIG. 1 for example, where beamfocusing is desired. Each of $b_1, b_2, b_3 \ldots b_N$ in this beamfocusing vector is a complex number that represents the magnitude and phase of the signal received from location b at each of the antenna nodes of the set of N antennas:

$$b = \begin{bmatrix} b_1 \\ b_2 \\ b_3 \\ \vdots \\ b_N \end{bmatrix} \tag{3}$$

Another complex vector, illustrated below as equation (4), may define the magnitude and phase of a transmitted signal x transmitted by each of the antenna nodes of the set of N antennas that would produce a null at the desired location n, such as location 140 in FIG. 1 for example. Each of $n_1, n_2, n_3 \ldots b_N$ in this nulling vector is a complex number that represents the magnitude and phase of the signal transmitted to location n at each of the antenna nodes of the set of N antennas:

$$n = \begin{bmatrix} n_1 \\ n_2 \\ n_3 \\ \vdots \\ n_N \end{bmatrix} \tag{4}$$

To create a nulled signal in a location defined by n, $nn^H$ (where $n^H$ denotes the Hermitian transpose of n) may be added to the covariance matrix determined using equation (2), as shown below in equation (5). This may be used to describe a "fake" signal at the location at which nulling is desired so that the nulling algorithm will generate a null at that location. In equation (5), $G_{nd}$ denotes the inverse of a desired nulling depth. A nulling depth may be a quantity of decibels that the signal is desired to be reduced. For example, if a signal is being broadcast at 100 watts, but the signal power at the location where the signal is desired to be nulled is one watt, $G_{nd}$ would be 100.

$$R = xx^H + G_{nd}nn^H \tag{5}$$

A weight vector, as shown in equation (7), may then be generated using equation (6) that defines w (where $b^H$ denotes the Hermitian transpose of b). In this equation, $R^{-1}b$ is divided by $b^H R^{-1} b$ to eliminate or cancel out portions of the transmitted or received signal, thereby nulling the signal at a desired location:

$$w = \frac{1}{b^H R^{-1} b} R^{-1} b \tag{6}$$

Weight vector w is shown in equation (7):

$$w = \begin{bmatrix} w_1 \\ w_2 \\ w_3 \\ \vdots \\ w_N \end{bmatrix} \quad (7)$$

The weighting defined in weight vector w may then be applied by multiplying signals $x_1, x_2, x_3, \ldots x_N$ received or transmitted by the set of N antennas, such as signals 111, 112, 113, and 114 transmitted or received by antennas 101, 102, 103, and 104, by w.

Weight vector w may be applied to signals being transmitted by a set of antennas, to signals received by a set of antennas, or both. Thus, referring again to FIG. 1, a weight vector w may be generated and applied, in one example by controller 110, to signals 111, 112, 113, and 114 transmitted or received by antennas 101, 102, 103, and 104 by multiplying each of signals 111, 112, 113, and 114 by w in order to null signals transmitted to or received from location 140 and to beamfocus signals transmitted to or received from location 130.

Figure 2:
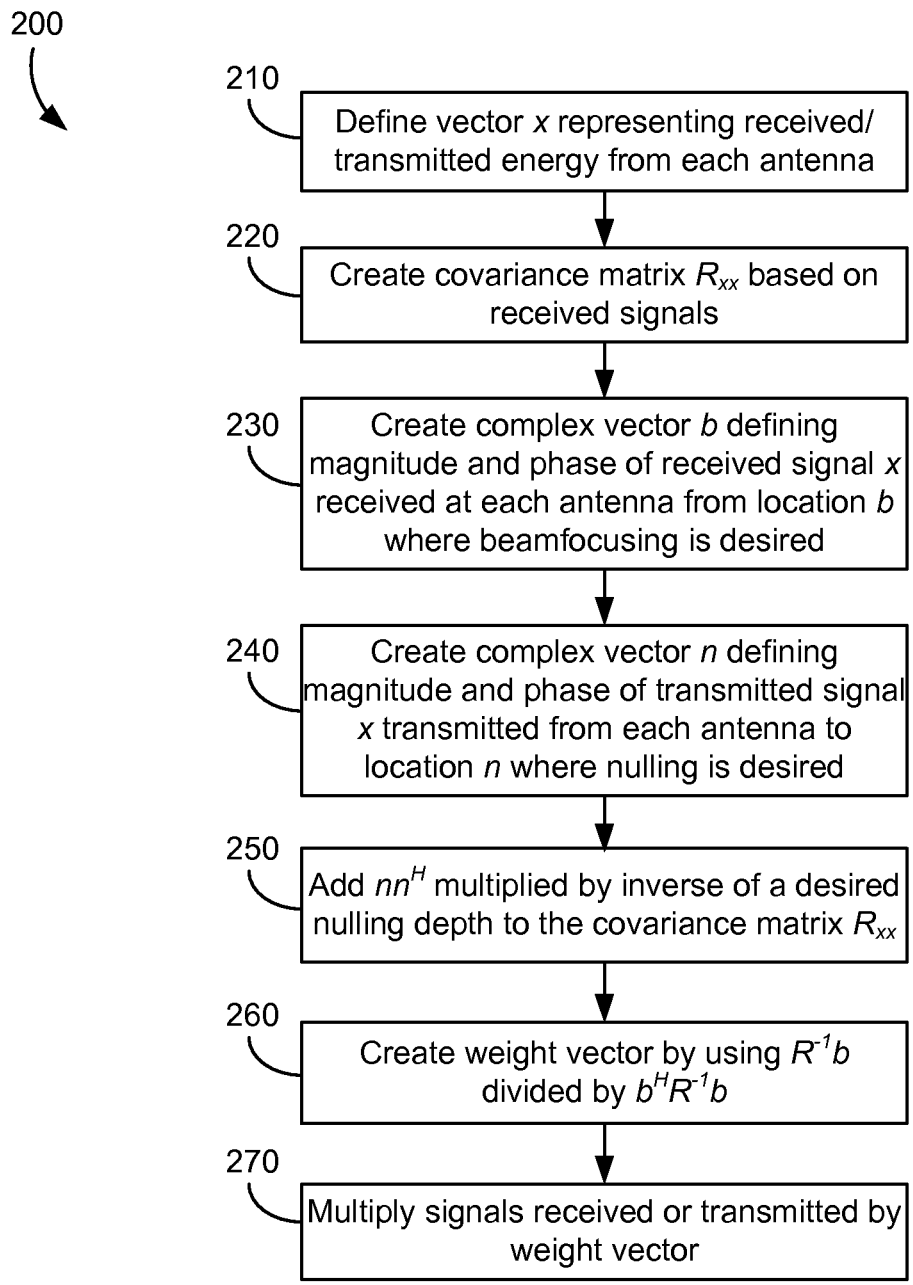
FIG. 2 is an illustration of operations performed by one example of the disclosed subject matter.

FIG. 2 illustrates exemplary, non-limiting method 200 of implementing an example of the subject matter disclosed herein. Method 200, and the individual actions and functions described in method 200, may be performed by any one or more devices, including those described herein. In an example, method 200 may be performed by a device such as controller 110, in some examples in conjunction with software configured and/or executing on controller 110. Alternatively, method 200 may be performed by one or more other device in communication with one or more antennas, such as antennas 101, 102, 103, and 104. Note that any of the functions and/or actions described in regard to any of the blocks of method 200 may be performed in any order, in isolation, with a subset of other functions and/or actions described in regard to any of the other blocks of method 200 or any other method described herein, and in combination with other functions and/or actions, including those described herein and those not set forth herein. Processor-executable instructions for performing some or all of method 200 may be stored in a memory or other storage device accessible by a processor, such as any processor described herein or otherwise, and may be executed by such a processor to create a device implementing an example of the present disclosure. All such examples are contemplated as within the scope of the present disclosure.

At block 210, a vector x may be defined as the (RF) energy $x_1, x_2, x_3, \ldots x_N$ transmitted or received from a set of N antennas, as shown in equation (1) above. At block 220, a covariance matrix $R_{xx}$ may be created based on the received signals $x_1, x_2, x_3, \ldots x_N$ from equation (1) and the Hermitian transpose of x, as shown in equation (2) above. At block 230, a complex vector, shown as equation (3) above, may be defined that provides the magnitude and phase that a received signal x at each of the antenna nodes of the set of N antennas would receive from a location b where beamfocusing is desired. At block 240, a complex vector, shown as equation (4) above, may be defined that provides the magnitude and phase of a transmitted signal x transmitted by each of the antenna nodes of the set of N antennas that would produce a null at a desired location n.

At block 250, $nn^H$ may be added to the covariance matrix determined using equation (2) above as shown above in equation (5). This may define a nulled signal at a location defined by n. A weight vector w may then be determined using equation (6) above to define each member of w and generate, in block 260 and as shown in equation (7) above, weight vector w. At block 270, the signals transmitted or received at a set of antennas may be multiplied by weight vector w in order to introduce the nulling and beamfocusing aspects to the signals.

Figure 3:
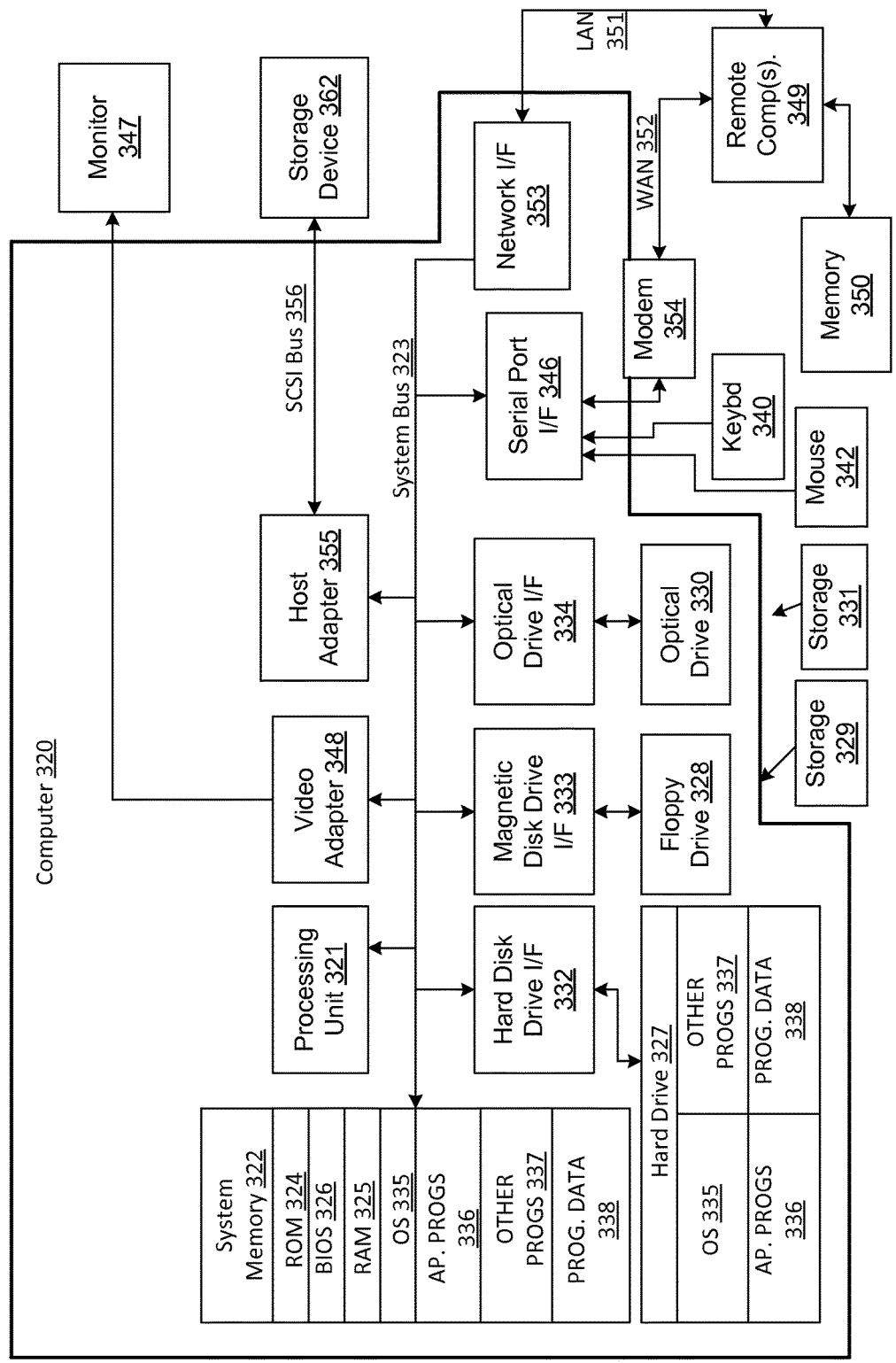
FIG. 3 depicts an example computing environment in which operations according to the disclosed subject matter may be performed.

FIG. 3 and the following discussion are intended to provide a brief general description of a suitable computing environment in which the methods and systems disclosed herein and/or portions thereof may be implemented. For example, the functions of controller 110, antennas 101, 102, 103, and 104, and any other device that may be used to implement aspects of the instant disclosure may be performed by one or more devices that include some or all of the aspects described in regard to FIG. 3. Some or all of the devices described in FIG. 3 that may be used to perform functions of the claimed examples may be configured in other devices and systems such as those described herein. Alternatively, some or all of the devices described in FIG. 3 may be included in any device, combination of devices, or any system that performs any aspect of a disclosed example.

Although not required, the methods and systems disclosed herein for nulling and beamfocusing may be described in the general context of computer-executable instructions, such as program modules, being executed by a computer, such as a client workstation, server or personal computer. Such computer-executable instructions may be stored on any type of computer-readable storage device that is not a transient signal per se. Generally, program modules include routines, programs, objects, components, data structures and the like that perform particular tasks or implement particular abstract data types. Moreover, it should be appreciated that the methods and systems for nulling and beamfocusing disclosed herein and/or portions thereof may be practiced with other computer system configurations, including hand-held devices, multi-processor systems, microprocessor-based or programmable consumer electronics, network PCs, minicomputers, mainframe computers and the like. The methods and systems for nulling and beamfocusing disclosed herein may also be practiced in distributed computing environments where tasks are performed by remote processing devices that are linked through a communications network. In a distributed computing environment, program modules may be located in both local and remote memory storage devices.

FIG. 3 is a block diagram representing a general purpose computer system in which aspects of the methods and systems for nulling and beamfocusing disclosed herein and/or portions thereof may be incorporated. As shown, the exemplary general purpose computing system includes computer 320 or the like, including processing unit 321, system memory 322, and system bus 323 that couples various system components including the system memory to processing unit 321. System bus 323 may be any of several types of bus structures including a memory bus or memory controller, a peripheral bus, and a local bus using any of a variety of bus architectures. The system memory may include read-only memory (ROM) 324 and random access memory (RAM) 325. Basic input/output system 326 (BIOS), which may contain the basic routines that help to transfer information between elements within computer 320, such as during start-up, may be stored in ROM 324.

Computer 320 may further include hard disk drive 327 for reading from and writing to a hard disk (not shown), magnetic disk drive 328 for reading from or writing to removable magnetic disk 329, and/or optical disk drive 330 for reading from or writing to removable optical disk 331 such as a CD-ROM or other optical media. Hard disk drive 327, magnetic disk drive 328, and optical disk drive 330 may be connected to system bus 323 by hard disk drive interface 332, magnetic disk drive interface 333, and optical drive interface 334, respectively. The drives and their associated computer-readable media provide non-volatile storage of computer-readable instructions, data structures, program modules and other data for computer 320.

Although the example environment described herein employs a hard disk, removable magnetic disk 329, and removable optical disk 331, it should be appreciated that other types of computer-readable media that can store data that is accessible by a computer may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on hard disk drive 327, magnetic disk 329, optical disk 331, ROM 324, and/or RAM 325, including an operating system 335, one or more application programs 336, other program modules 337 and program data 338. A user may enter commands and information into the computer 320 through input devices such as a keyboard 340 and pointing device 342. Other input devices (not shown) may include a microphone, joystick, game pad, satellite disk, scanner, or the like. These and other input devices are often connected to the processing unit 321 through a serial port interface 346 that is coupled to the system bus, but may be connected by other interfaces, such as a parallel port, game port, or universal serial bus (USB). A monitor 347 or other type of display device may also be connected to the system bus 323 via an interface, such as a video adapter 448. In addition to the monitor 347, a computer may include other peripheral output devices (not shown), such as speakers and printers. The exemplary system of FIG. 3 may also include host adapter 355, Small Computer System Interface (SCSI) bus 356, and external storage device 362 that may be connected to the SCSI bus 356.

The computer 320 may operate in a networked environment using logical and/or physical connections to one or more remote computers or devices, such as remote computer 349, that may represent any remote computer or device with which computer 320 may communicate. Remote computer 349 may be a personal computer, a server, a router, a network PC, a peer device or other common network node, and may include many or all of the elements described above relative to the computer 320, although only a memory storage device 350 has been illustrated in FIG. 3. The logical connections depicted in FIG. 3 may include local area network (LAN) 351 and wide area network (WAN) 352. Such networking environments are commonplace in police and military facilities, offices, enterprise-wide computer networks, intranets, and the Internet.

When used in a LAN networking environment, computer 320 may be connected to LAN 351 through network interface or adapter 353. When used in a WAN networking environment, computer 320 may include modem 354 or other means for establishing communications over wide area network 352, such as the Internet. Modem 354, which may be internal or external, may be connected to system bus 323 via serial port interface 346. In a networked environment, program modules depicted relative to computer 320, or portions thereof, may be stored in a remote memory storage device. It will be appreciated that the network connections shown are exemplary and other means of establishing a communications link between computers may be used.

Computer 320 may include a variety of computer-readable storage media. Computer-readable storage media can be any available tangible, non-transitory, or non-propagating media that can be accessed by computer 320 and includes both volatile and nonvolatile media, removable and non-removable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium that can be used to store the desired information and that can be accessed by computer 320. Combinations of any of the above should also be included within the scope of computer-readable media that may be used to store source code for implementing the methods and systems described herein. Any combination of the features or elements disclosed herein may be used in one or more examples.

It will be appreciated that, while processor-executable instructions are described as being stored in memory or on storage while being used, these instructions or portions of them may be transferred between memory and other storage devices. Alternatively, in other examples some or all of the instructions may execute in memory on another device and communicate with the described systems via inter-computer communication. In some examples, some or all of the systems and/or instructions may be implemented or provided in other ways, such as at least partially in firmware and/or hardware, including, but not limited to, one or more ASICs, standard integrated circuits, controllers (e.g., by executing appropriate instructions, and including microcontrollers and/or embedded controllers), FPGAs, complex programmable logic devices (CPLDs), etc. Some or all of the instructions, systems and data structures may also be stored (e.g., as software instructions or structured data) on a computer-readable medium, such as a hard disk, a memory, a network, or a portable media article to be read by an appropriate drive or via an appropriate connection. The systems, instructions, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other examples. Accordingly, the present invention may be practiced with other computer system configurations.

In some examples, a system memory may be used that is a computer-readable storage medium configured to store program instructions and data as described above for FIGS. 1-2 for implementing examples of the corresponding methods and systems for nulling and beamfocusing. However, in other examples, program instructions and/or data may be received, sent or stored upon different types of computer-accessible media. Generally speaking, a computer-readable storage medium may include non-transitory and tangible storage media or memory media such as magnetic or optical media, e.g., disk or DVD/CD coupled to a computer system or gateway device. A computer-readable storage medium may also include any volatile or non-volatile media such as RAM (e.g., SDRAM, DDR SDRAM, RDRAM, SRAM, etc.), ROM, etc., that may be included in some examples of the computer systems described above as system memory or another type of memory. Portions or all of the systems such as those illustrated herein may be used to implement the described functionality in various examples. For example, software components running on a variety of different devices and servers may collaborate to provide the disclosed functionality.

It will be appreciated that in some examples the functionality provided by the routines discussed above may be provided in alternative ways, such as being split among more routines or consolidated into fewer routines. Similarly, in some examples, illustrated routines may provide more or less functionality than is described, such as when other illustrated routines instead lack or include such functionality respectively or when the amount of functionality that is provided is altered. In addition, while various operations may be illustrated as being performed in a particular manner (e.g., in serial or in parallel) and/or in a particular order, in other examples the operations may be performed in other orders and in other manners. Similarly, the data structures discussed above may be structured in different ways in other examples, such as by having a single data structure split into multiple data structures or by having multiple data structures consolidated into a single data structure, and may store more or less information than is described (e.g., when other illustrated data structures instead lack or include such information respectively, or when the amount or types of information that is stored is altered).

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

In general, the various features and processes described above may be used independently of one another, or may be combined in different ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example examples. The example systems and components described herein may be configured differently than described. For example, elements may be added to, removed from, or rearranged compared to the disclosed example examples.

While certain example or illustrative examples have been described, these examples have been presented by way of example only, and are not intended to limit the scope of the inventions disclosed herein. Indeed, the novel methods and systems described herein may be embodied in a variety of other forms. The accompanying claims and their equivalents are intended to cover such forms or modifications as would fall within the scope and spirit of certain of the inventions disclosed herein.

The invention claimed is:

1. A method of beamfocusing and nulling signals carried by electromagnetic waves, the method comprising:

determining a first vector x representing a magnitude and phase of signals transmitted or received at each of a plurality of disparate antennas, wherein each of the plurality of disparate antennas is configured with electromagnetic transmission and reception components and a signal processing component, and wherein each disparate antenna is geographically separate from each other disparate antenna;

determining a covariance matrix of the first vector x ($R_{xx}$) based on the received signals as a product of the first vector x and a Hermitian transpose of the first vector $x^H$;

determining a complex vector b defining a magnitude and phase of signals that would be received by the plurality of disparate antennas from a location b where beamforming is desired;

determining a complex vector n defining a magnitude and phase of signals a transmitted by the plurality of disparate antennas that would produce a null at desired location n;

determining a weight vector w according to $$w = \frac{1}{b^H R^{-1} b} R^{-1} b,$$

wherein:

$$R = xx^H + G_{nd} nn^H;$$

$b^H$ denotes a Hermetian transpose of b
$G_{nd}$ denotes a desired nulling depth;
and nH denotes a Hermetian transpose of n; and applying the weight vector w to signals at the plurality of disparate antennas, comprising:

multiplying signals transmitted or received by the plurality of antennas by the weight vector w, to achieve beamfocusing at the location b and nulling at the location n;

wherein each of said plurality of disparate antennas is configured on a separate and distinct mobile radio.

2. A system for beamfocusing and nulling signals carried by electromagnetic waves, the system comprising:

a plurality of disparate antennas configured with electromagnetic transmission and reception components and a signal processing component, wherein each disparate antenna is geographically separate from each other disparate antenna;

a memory comprising executable instructions; and a processor operatively coupled to the plurality of disparate antennas, wherein the processor, when executing the executable instructions, effectuates operations comprising:

determining a first vector x representing a magnitude and phase of signals received at each of a plurality of disparate antennas;

determining a covariance matrix of the first vector x ($R_{xx}$) based on the received signals as a product of the first vector x and a Hermitian transpose of the first vector $x^H$;

determining a complex vector b defining a magnitude and phase of signals that would be received by the plurality of disparate antennas from a location b where beamforming is desired;

determining a complex vector n defining a magnitude and phase of signals a transmitted by the plurality of disparate antennas that would produce a null at desired location n;

determining a weight vector w according to $$w = \frac{1}{b^H R^{-1} b} R^{-1} b,$$

wherein:

$R = xx^H + G_{nd} nn^H$;

$b^H$ denotes a Hermetian transpose of b $G_{nd}$ denotes a desired nulling depth;

and $n^H$ denotes a Hermetian transpose of n; and applying the weight vector to signals at the plurality of disparate antennas comprising multiplying signals transmitted or received by the plurality of disparate antennas by the weight vector, to achieve beamfocusing at the location b and nulling at the location n; and wherein each of said plurality of disparate antennas is configured on a separate and distinct mobile radio.

3. A non-transitory computer-readable storage device having computer-readable instructions stored thereon, the computer-readable instructions comprising instructions that, when executed by a processor, cause the processor to effectuate operations comprising:

determining a first vector x representing a magnitude and phase of signals transmitted or received at each of a plurality of disparate antennas, wherein each of the plurality of antennas is configured with electromagnetic transmission and reception components and a signal processing component, and wherein each disparate antenna is geographically separate from each other antenna;

determining a covariance matrix of the first vector x ($R_{xx}$) based on the received signals as a product of the first vector x and a Hermitian transpose of the first vector $x^H$;

determining a complex vector b defining a magnitude and phase of signals that would be received by the plurality of disparate antennas from a location b where beamforming is desired;

determining a complex vector n defining a magnitude and phase of signals a transmitted by the plurality of disparate antennas that would produce a null at desired location n;

determining a weight vector w according to $$w = \frac{1}{b^H R^{-1} b} R^{-1} b,$$

wherein:

$R = xx^H + G_{nd} nn^H$;

$b^H$ denotes a Hermetian transpose of b;

$G_{nd}$ denotes a desired nulling depth;

and $n^H$ denotes a Hermetian transpose of n; and applying the weight vector w to signals at the plurality of disparate antennas, comprising:

multiplying signals transmitted or received by the plurality of antennas by the weight vector w, to achieve beamfocusing at the location b and nulling at the location n;

wherein each of said plurality of disparate antennas is configured on a separate and distinct mobile radio.

4. A method of beamfocusing and nulling signals carried by electromagnetic waves, the method comprising:

determining a first vector representing signals received at each of a plurality of disparate antennas, wherein each of the plurality of disparate antennas is configured with electromagnetic transmission and reception components and a signal processing component, and wherein each disparate antenna is geographically separate from each other disparate antenna;

determining a weight vector based on the first vector, a nulling location, and a beamfocusing location; and applying the weight vector to signals at the plurality of disparate antennas, wherein applying the weight vector to the signals at the plurality of disparate antennas comprises multiplying signals transmitted or received by the plurality of antennas by the weight vector, thereby achieving beamfocusing at the beamfocusing location and nulling at the nulling location;

wherein determining the weight vector comprises generating a covariance matrix using a beamfocusing vector representing a magnitude and a phase of signals received at the beamfocusing location, and a nulling vector representing a magnitude and a phase of signals received at the nulling location; and wherein said plurality of disparate antennas comprises at least one antenna carried by a mobile vehicle separate from the other disparate antenna(s)

wherein at least one of said plurality of disparate antennas is of a first antenna type including an omnidirectional type, a dipole type and an array type, and another of the said plurality of disparate antennas is of a second antenna type different than the first antenna type.

* * * * *